US012626195B2

(12) United States Patent
Fusting et al.

(10) Patent No.: US 12,626,195 B2
(45) Date of Patent: May 12, 2026

(54) PREDICTING USER ATTRIBUTES USING UNCERTAINTY ESTIMATE MODELING

(71) Applicant: FMR LLC, Boston, MA (US)

(72) Inventors: Christopher Fusting, Raleigh, NC (US); Lei Zhang, Chapel Hill, NC (US); Wenlu Yan, Poway, CA (US)

(73) Assignee: FMR LLC, Boston, MA (US)

( * ) Notice: Subject to any disclaimer, the term of this patent is extended or adjusted under 35 U.S.C. 154(b) by 724 days.

(21) Appl. No.: 18/070,603

(22) Filed: Nov. 29, 2022

(65) Prior Publication Data

US 2024/0177068 A1     May 30, 2024

(51) Int. Cl.
*G06F 16/00* (2019.01)
*G06N 20/20* (2019.01)
*G06Q 40/06* (2012.01)

(52) U.S. Cl.
CPC ............. *G06N 20/20* (2019.01); *G06Q 40/06* (2013.01)

(58) Field of Classification Search
CPC ................................ G06N 20/20; G06Q 40/06
See application file for complete search history.

(56) References Cited

U.S. PATENT DOCUMENTS

| | | | |
|---|---|---|---|
| 11,037,238 B1 | 6/2021 | Mishraky | |
| 11,816,550 B1 * | 11/2023 | Gupta ....................... | G06N 5/01 |
| 12,236,334 B2 * | 2/2025 | Kurasawa ................ | G06N 3/08 |
| 2018/0262003 A1 * | 9/2018 | Yabe ........................ | G01W 1/10 |
| 2022/0198282 A1 * | 6/2022 | Amad .................... | G06F 18/254 |
| 2022/0391550 A1 * | 12/2022 | Decrop ................... | G06F 30/20 |
| 2022/0405615 A1 * | 12/2022 | Prokhorenkova ...... | G06N 20/20 |
| 2023/0080851 A1 * | 3/2023 | Zoldi ..................... | G06N 3/045 |
| | | | 706/15 |
| 2023/0376761 A1 * | 11/2023 | Mcinerney ............... | G06N 7/01 |
| 2023/0419119 A1 * | 12/2023 | Lal .......................... | G06N 20/20 |

(Continued)

OTHER PUBLICATIONS

T. Duan et al., "NGBoost: Natural Gradient Boosting for Probabilistic Prediction," Proceedings of the 37th International Conference on Machine Learning, Vienna, Austria, PMLR 108, arXiv:1910.03225v4 [cs.LG] Jun. 9, 2020, 11 pages.

(Continued)

*Primary Examiner* — Khanh B Pham
(74) *Attorney, Agent, or Firm* — Cesari and McKenna, LLP

(57) ABSTRACT

Methods and apparatuses are described for predicting user attributes using uncertainty estimate modeling. A server trains a plurality of machine learning (ML) models to predict a distribution of values for a plurality of user attributes. The server determines an uncertainty measure of the ML models for each user attribute based upon the predicted distribution of values. The server receives a request for prediction of user attributes from a client device and generates for each user attribute a first predicted distribution using one or more of the trained models. The server classifies, for each user attribute, an accuracy of the first predicted distribution based upon the uncertainty measure and provides the first predicted distribution and the accuracy for each user attribute to the client device for presentation. The server updates the first predicted value for the user attributes based upon input received from the client computing device.

20 Claims, 9 Drawing Sheets

*MODEL TRAINING*

400

(56) References Cited

U.S. PATENT DOCUMENTS

2024/0169707 A1\*   5/2024   Shamir  ............... G06V 10/776

OTHER PUBLICATIONS

A. Malinin et al., "Uncertainty in Gradient Boosting via Ensembles," ICLR 2021, arXiv:2006.10562v4 [cs.LG] Apr. 2, 2021, 17 pages.

U. Sarawgi et al., "Uncertainty-Aware Boosted Ensembling in Multi-Modal Settings," arXiv:2104.10715v1 [cs.LG] Apr. 21, 2021, 9 pages.

S. Lundberg, "Census income classification with XGBoost," SHAP, Tabular Examples, Revision 45b85c18, 2018, available at https://shap.readthedocs.io/en/latest/example_notebooks/tabular_examples/tree_based_models/Census%20income%20classification%20with%20XGBoost.html, 21 pages.

P. Misra and A. Singh Yadav, "Improving the Classification Accuracy using Recursive Feature Elimination with Cross-Validation," International Journal on Emerging Technologies 11(3): 659-665 (2020), 7 pages.

C. Wijaya, "Breaking down the agglomerative clustering process," Towards Data Science, available at https://towardsdatascience.com/breaking-down-the-agglomerative-clustering-process-1c367f74c7c2, Dec. 17, 2019, 16 pages.

\* cited by examiner

Server Computing Device 106

Historical User Profile Database 109

Model Training Module 106d

ML Models

Model 108a

Model 108b

...

Model 108n

User Interface (UI) Module 106a

Prediction Generation Module 106b

Prediction Classification Module 106c

Web Server 110

Web Application 110a

Client Device 102

User

Network 104

Train a plurality of gradient boosting ML models using historical user profile data to predict a distribution of values for each of a plurality of user attributes 202

Determine an uncertainty measure of the plurality of gradient boosting ML models for each user attribute based upon the predicted distribution of values generated by each ML model 204

Receive a request for prediction of one or more user attributes from a client computing device, including a user identifier of a user at the client computing device 206

Generate, for each user attribute, a first predicted distribution for the user attribute using one or more of the trained gradient boosting ML models 210

Classify, for each user attribute, an accuracy of the first predicted distribution for the user attribute based upon the uncertainty measure of the trained gradient boosting ML models 212

Provide the first predicted distribution and the accuracy for each user attribute to the client computing device for display of a first predicted value from the distribution 214

Update, for each user attribute, the first predicted value for the user attribute based upon input received from the client computing device 216

Figure 3:
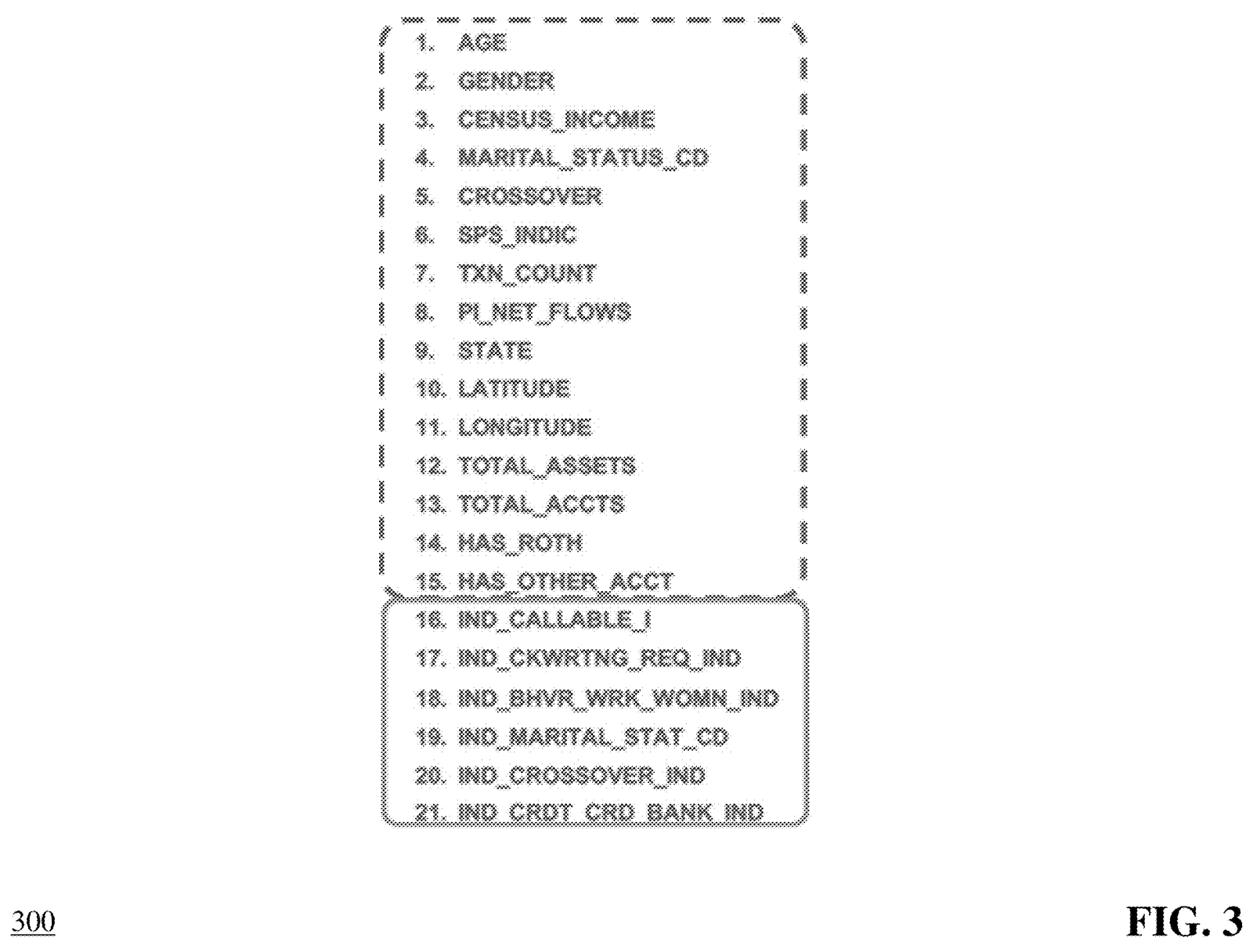

1. AGE
2. GENDER
3. CENSUS_INCOME
4. MARITAL_STATUS_CD
5. CROSSOVER
6. SPS_INDIC
7. TXN_COUNT
8. PL_NET_FLOWS
9. STATE
10. LATITUDE
11. LONGITUDE
12. TOTAL_ASSETS
13. TOTAL_ACCTS
14. HAS_ROTH
15. HAS_OTHER_ACCT

16. IND_CALLABLE_J
17. IND_CXWRTNG_REQ_IND
18. IND_BHVR_WRK_WOMN_IND
19. IND_MARITAL_STAT_CD
20. IND_CROSSOVER_IND
21. IND_CRDT_CRD_BANK_IND

300

400

500

600

Mean = $ 80,000
Standard deviation = $ 4,000

800

Figure 9:
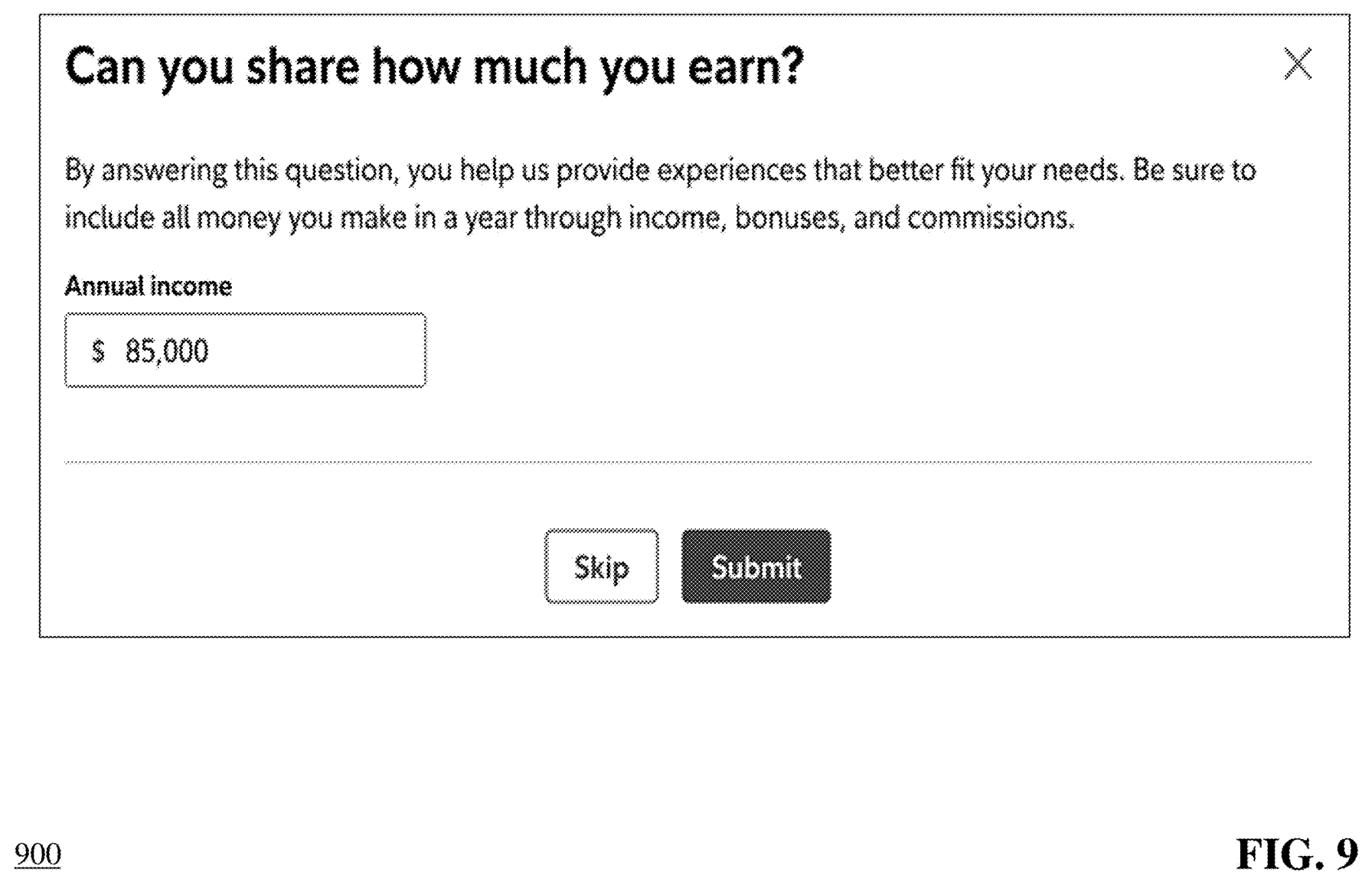

Can you share how much you earn?

By answering this question, you help us provide experiences that better fit your needs. Be sure to include all money you make in a year through income, bonuses, and commissions.

Annual income $ 85,000

Skip

Submit

PREDICTING USER ATTRIBUTES USING UNCERTAINTY ESTIMATE MODELING

TECHNICAL FIELD

This application relates generally to methods and apparatuses, including computer program products, for predicting user attributes using uncertainty estimate modeling via an ensemble of gradient boosting machine learning models.

BACKGROUND

Large consumer-facing companies constantly face a challenge of providing customized, actionable information to their customers. Often, this information is dependent upon evaluation of historical customer information in order to predict user attributes or characteristics for use in generating the customized information. As one example, an organization may provide a retirement planning tool that generates a retirement forecast for a given user based upon, e.g., estimates of the user's salary, age, savings, and other relevant information. However, many times the uncertainty around the predictions generated by such systems may be high—which can result in flawed customer information that is based upon inaccurate predictions.

Existing systems attempt to leverage machine learning techniques to generate accurate predictions of user attributes. In some examples, systems use probabilistic methods for regression when generating predictions—such as post-hoc variance, Generalized additive models for location scale and shape (GAMLSS), Bayesian methods, or Bayesian deep learning. However, each of these methods has significant drawbacks; typically they are slow, inflexible, do not scale, and are hard to use. In addition, such techniques may be affected by aleatoric uncertainty (that is, uncertainty around the training data input to the model) and/or epistemic uncertainty (that is, uncertainty around the predictions made by the model). In these cases, it can be difficult to adequately account for such uncertainty in model predictions so that modifications are made to application workflow in view of the relative accuracy or inaccuracy of the predictions.

SUMMARY

Therefore, what is needed are improved methods and systems for predicting user attributes using uncertainty estimate modeling that leverage gradient boosting based machine learning models to understand whether a prediction made by a model is accurate. The techniques provided herein advantageously utilize uncertainty estimates to engage customers and improve data and predictions, and also use uncertainty estimates to target customers with little or poor-quality data for proactive data collection.

The invention, in one aspect, features a system for predicting user attributes using uncertainty estimate modeling. The system comprises a server computing device with a memory for storing computer-executable instructions and a processor that executes the computer-executable instructions. The server computing device trains each of a plurality of machine learning models using historical user profile data to predict a distribution of values for each of a plurality of user attributes. The server computing device determines an uncertainty measure of the plurality of machine learning models for each user attribute based upon the predicted distribution of values generated by each machine learning model for the user attribute. The server computing device receives a request for prediction of one or more user attributes from a client computing device, the request including a user identifier of a user at the client computing device. The server computing device generates, for each of the one or more user attributes, a first predicted distribution for the user attribute using one or more of the trained gradient boosting machine learning models. The server computing device classifies, for each of the one or more user attributes, an accuracy of the first predicted distribution for the user attribute based upon the uncertainty measure of the plurality of machine learning models for the user attribute. The server computing device provides the first predicted distribution and the accuracy for each of the one or more user attributes to the client computing device, where a first predicted value of the user attribute from the first predicted distribution is displayed in a user interface on the client computing device and one or more sensory features of the displayed first value correspond to the accuracy. The server computing device updates, for each of the one or more user attributes, the first predicted value for the user attribute based upon input received from the client computing device.

The invention, in another aspect, features a computerized method of predicting user attributes using uncertainty estimate modeling. A server computing device trains each of a plurality of machine learning models using historical user profile data to predict a distribution of values for each of a plurality of user attributes. The server computing device determines an uncertainty measure of the plurality of machine learning models for each user attribute based upon the predicted distribution of values generated by each machine learning model for the user attribute. The server computing device receives a request for prediction of one or more user attributes from a client computing device, the request including a user identifier of a user at the client computing device. The server computing device generates, for each of the one or more user attributes, a first predicted distribution for the user attribute using one or more of the trained gradient boosting machine learning models. The server computing device classifies, for each of the one or more user attributes, an accuracy of the first predicted distribution for the user attribute based upon the uncertainty measure of the plurality of machine learning models for the user attribute. The server computing device provides the first predicted distribution and the accuracy for each of the one or more user attributes to the client computing device, where a first predicted value of the user attribute from the first predicted distribution is displayed in a user interface on the client computing device and one or more sensory features of the displayed first value correspond to the accuracy. The server computing device updates, for each of the one or more user attributes, the first predicted value for the user attribute based upon input received from the client computing device.

Any of the above aspects can include one or more of the following features. In some embodiments, the predicted distribution of values for each user attribute comprises a distribution with predicted summary statistics. In some embodiments, the uncertainty measure for the plurality of machine learning models comprises (i) a variance of predicted means from each machine learning model for the given user attribute and (ii) a mean of predicted standard deviations from each machine learning model for the given user attribute. In some embodiments, training each of a plurality of machine learning models using historical user profile data to predict a distribution of values for each of a plurality of user attributes comprises training each machine learning model on a different subset of the historical user profile data.

In some embodiments, generating a first predicted distribution for the user attribute using one or more of the trained machine learning models comprises identifying a number of trained machine learning models to execute based upon the request received from the client computing device; determining one or more characteristics of the user based upon the user identifier; executing each of the identified machine learning models using the one or more characteristics as input to generate a predicted distribution for the user attribute; and combining the predicted distributions generated by each identified machine learning model to create the first predicted distribution. In some embodiments, the uncertainty measure of the plurality of machine learning models for each user attribute comprises a coefficient of variation based upon a predicted mean and a predicted standard deviation for each machine learning model. In some embodiments, classifying an accuracy of the first predicted distribution for the user attribute based upon the uncertainty measure of the plurality of machine learning models for the user attribute comprises comparing the uncertainty measure of the plurality of machine learning models for the user attribute to a threshold value; selecting a prediction classifier based upon the comparison; and classifying the accuracy of the first predicted distribution for the user attribute using the prediction classifier.

In some embodiments, the historical user profile data comprises user demographic attributes, user asset values, user account information, and user behavior attributes. In some embodiments, the plurality of user attributes comprise a salary, a net worth, and a retirement age. In some embodiments, the one or more sensory features of the displayed value comprise a color that changes based upon the accuracy. In some embodiments, the input received from the client computing device comprises a replacement value for the user attribute. In some embodiments, the input received from the client computing device comprises an indicator confirming the accuracy of the first predicted value for the user attribute.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of predicting user attributes using uncertainty estimate modeling.

FIG. 3 is a diagram of an exemplary feature set used to train models gradient boosting based machine learning models.

FIG. 9 is a diagram of an exemplary user interface requesting updated salary information from the user.

DETAILED DESCRIPTION

Figure 1:
FIG. 1 is a block diagram of a system for predicting user attributes using uncertainty estimate modeling.

FIG. 1 is a block diagram of a system 100 for predicting user attributes using uncertainty estimate modeling. System 100 includes client computing device 102, communications network 104, server computing device 106 that includes a user interface (UI) module 106a, a prediction generation module 106b, a prediction classification module 106c, and a model training module 106d, and a plurality of machine learning models 108a-108n, and a historical user profile database 109. System also includes web server computing device 110 that comprises web application 110a.

Client computing device 102 connects to communications network 104 in order to communicate with server computing device 106 to provide input and receive output relating to the process of predicting user attributes using uncertainty estimate modeling as described herein. Client computing device 102 can be coupled to a display device (not shown), such as a monitor or screen. For example, client computing device 102 can provide a graphical user interface (GUI) via the display device to a user of the corresponding device that presents output resulting from the methods and systems described herein. In some embodiments, client computing device 102 is operated by an end user (e.g., a customer using the device 102 to receive electronic information such as website data via server computing device 106 (which can be operated by a business or other entity with which the customer has a relationship).

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communications network 104 enables client computing device 102, server computing device 106, and web server computing device 110 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for predicting user attributes using uncertainty estimate modeling as described herein. Server computing device 106 includes several computing modules 106a-106dc that execute on one or more processors of server computing device 106. In some embodiments, modules 106a-106d are specialized sets of computer software instructions programmed onto one or more dedicated processors in server computing device 106 and can include specifically designated memory locations and/or registers for executing the specialized computer software instructions.

Although modules 106a-106d are shown in FIG. 1 as executing within the same server computing device 106, in some embodiments the functionality of modules 106a-106d can be distributed among a plurality of server computing devices. As shown in FIG. 1, server computing device 106 enables modules 106a-106d to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 106a-106d is described in detail below.

Server computing device 106 also includes a plurality of machine learning (ML) classification models 108a-108n coupled to modules 106a-106d of server computing device 106. Each classification model 108a-108n comprises a supervised modeling algorithm, preferably a gradient boosting based ML algorithm. An exemplary gradient boosting based ML algorithm that can be used in models 108a-108n is NGBoost, as described in T. Duan et al., "NGBoost: Natural Gradient Boosting for Probabilistic Prediction," *Proceedings of the 37th International Conference on Machine Learning*, Vienna, Austria, 2020, arXiv: 1910.03225v4 (incorporated herein by reference). In addition to being able to make predictions, NGBoost also can estimate the variance around those predictions such that the uncertainty of those predictions can be estimated. This provides a measure of aleatoric or "data" uncertainty. It should be appreciated that, while FIG. 1 depicts three classification models 108a-108n, system 100 can comprise any number of classification models without departing from the scope of the technology described herein.

Historical user profile database 109 is located on server computing device 106 (or in some embodiments, on one or more computing devices coupled to the server computing device 106) and is configured to receive, generate, and store specific segments of data relating to the process of predicting user attributes using uncertainty estimate modeling as described herein. Databases 109 can be disk-based storage, random access memory (RAM), read-only memory (ROM), or other types of permanent or transient storage devices. Database 109 can be configured to store portions of data used by the other components of system 100, as will be described in greater detail below.

Historical user profile database 109 includes historical user profile data, which in some embodiments is a dedicated section of the database that contains specialized data used by the other components of system 100. Generally, the historical user profile data comprises data elements associated with user/customer attributes. For example, database 109 can store information such as user identification information (e.g., user ID, name, account number), user profile information (e.g., user demographics such as age, gender, marital status), user job title or job role information, retirement age, user account balances, user interaction information (e.g., transaction history), user financial information (e.g., salary, net worth), and the like.

Client computing device 102 connects to communication network 104 in order to communicate with web server 110 to participate in one or more web browsing sessions. As can be appreciated, web server 110 can be configured to host one or more websites and/or connect to other computing devices that provide web-related content to client computing device 102. For example, client computing device 102 can establish a communication session with web application 110a of web server 110 (e.g., via HTTP or HTTPS) using a uniform resource locator (URL) assigned to web server 110 and receive website content from web server 110. A user at client computing device 102 can interact with (e.g., browse) the website by activating links and navigating through various pages of the website. In some embodiments, each page or section of the website is associated with a particular URL. In some embodiments, client computing device 102 is coupled to an associated display device (not shown). For example, client computing device 102 can provide a graphical user interface (GUI) via the display device that is configured to receive input from a user of the corresponding device 102 and to present output (e.g., website content) to that user. In some embodiments, client computing device 102 is configured to connect to server computing device 106 directly via network 104.

Web server 110 is a computing device (or set of computing devices) to which client computing device 102 can connect to retrieve and display digital content items (such as web pages). Web server 110 is a combination of hardware, including one or more special-purpose processors and one or more physical memory modules, and specialized software modules (such as web application 110a) that are executed by one or more processors of web server 110. Typically, a website comprises a plurality of visual and non-visual elements that make up the content transmitted and displayed to a user when, e.g., browser software on client computing device 102 connects to web server 110 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on client computing device 102. Web application 110a is configured to establish browsing sessions with client computing device 102 and record session-related information (such as pages visited, URLs accessed, timestamps, page sequencing, and the like) for each user/client device. In addition, web application 110a provides functionality for a user of client computing device 102 to submit requests for information, execute transactions, review and update personal profile data, and so forth.

FIG. 2 is a flow diagram of a computerized method 200 of predicting user attributes using uncertainty estimate modeling, using system 100 of FIG. 1. At a first time, model training module 106d trains (step 202) a plurality of gradient boosting machine learning (ML) models (i.e., models 108a-108n) using historical user profile data retrieved from database 109 to predict a distribution of values for each of a plurality of user attributes. In some embodiments, model training module 106d generates a feature set using the historical user profile data to train the models 108a-108n. Generally, the feature set comprises a plurality of features or attributes of a user profile or a plurality of user profiles that may be considered as relevant to the prediction of user attributes. The feature set is then converted into a form that can be used to train the models 108a-108n. For example, the data values that comprise the plurality of features can be transformed into a numeric representation (e.g., a multidimensional vector or matrix of vectors) that models 108a-108n can receive as input for predicting a distribution of values for one or more user attributes. In some embodiments, the feature set comprises a multidimensional vector that corresponds to a particular user's profile. FIG. 3 is a diagram of an exemplary feature set 300 used to train models 108a-108n. As shown in FIG. 3, the feature set includes a plurality of different attributes—from demographic information (e.g., AGE, GENDER, MARITAL_STATUS_CD) to financial information (e.g., TOTAL_ASSETS, TOTAL_ACCTS, PI_NET_FLOWS) and other attributes (e.g., IND_CALLABLE_I), among others.

During the training process, model training module 106d can partition the historical user profile data into a plurality of subsets and utilize each subset as training data for a different model 108a-108n. As mentioned above, gradient boosting based machine learning algorithms such as NGBoost are able to both make predictions and estimate the variance around those predictions such that the uncertainty of those predictions can be estimated-thereby providing a measure of aleatoric or "data" uncertainty. Model training module 106d can train a plurality of models 108a-108n on different subsets of the historical user profile data, and the disagreement among the predictions and aleatoric uncertainty estimates of models 108a-108n are ensembled (e.g., weight-averaged) to yield epistemic or "model" uncertainty. With these two components—"data" uncertainty and "model" uncertainty—system 100 is able to understand the total uncertainty that model(s) 108a-108n have about a particular user's profile attribute and infer the accuracy of each prediction. Therefore, when a user interacts with, e.g., web application 110a to access functionality that relies upon user-specific attributes (such as a retirement planning tool that relies on a user's actual salary) and the user's profile is lacking data for such attributes, system 100 can generate accurate predictions of such attributes along with understanding the uncertainty of the resulting predictions.

Figure 4:
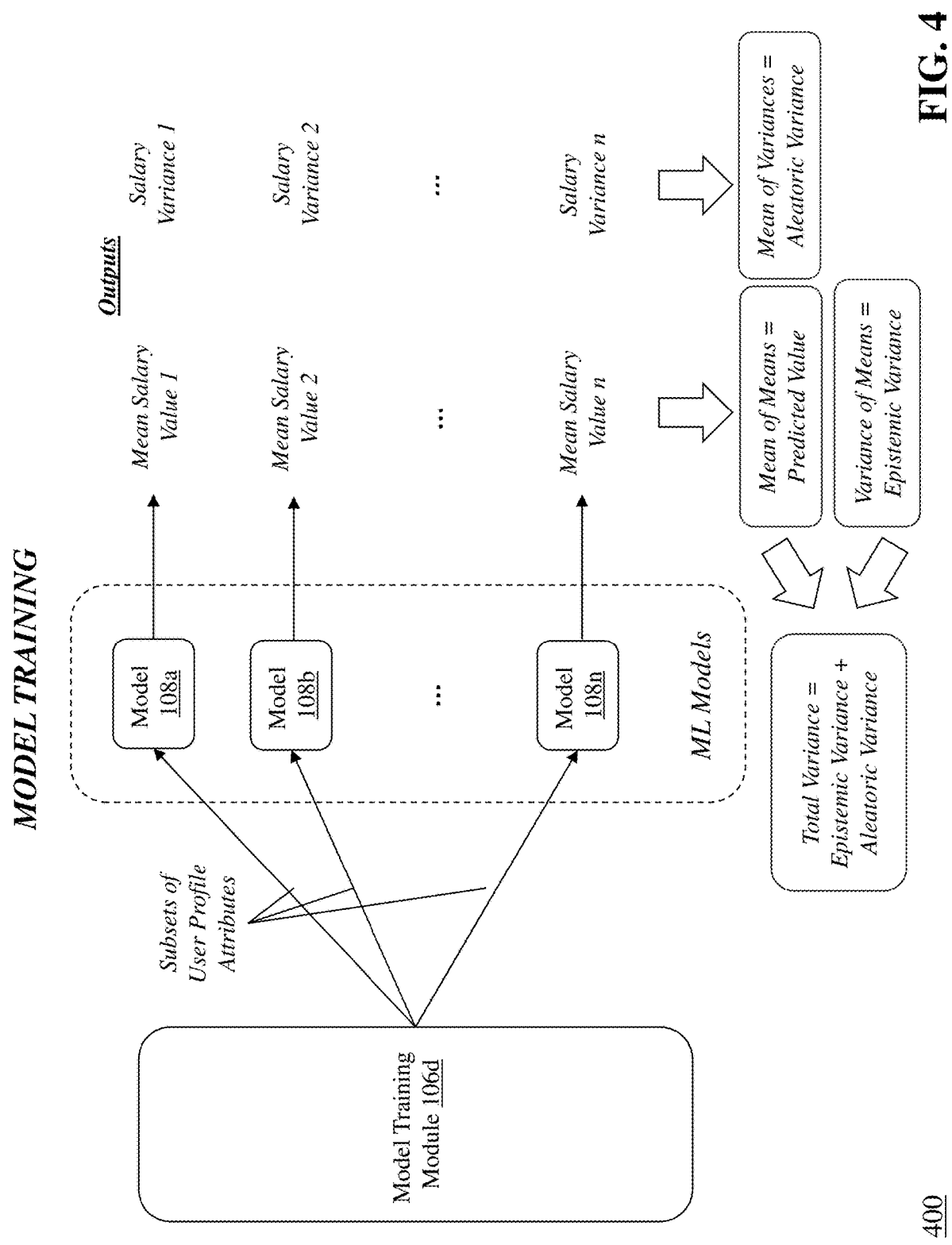
FIG. 4 is a workflow diagram of a computerized method for determining aleatoric and epistemic uncertainty during training of gradient boosting based machine learning models.

FIG. 4 is a workflow diagram of a computerized method for determining aleatoric and epistemic uncertainty during training of gradient boosting based ML models 108a-108n, using system 100 of FIG. 1. Model training module 106d retrieves a plurality of subsets of user profile data from database 109 and converts each of the subsets of user profile data into multidimensional vectors that are used as input for training models 108a-108n. In some embodiments, module 106d can perform supervised and/or unsupervised feature reduction techniques to generate the features for the multidimensional vector. An exemplary supervised technique for feature reduction is feature ranking with recursive feature elimination through cross validation—as described in P. Misra and A. Singh, "Improving the Classification Accuracy using Recursive Feature Elimination with Cross-Validation," International Journal on Emerging Technologies 11(3): 659-665 (2020), which is incorporated herein by reference. As can be understood, given an external estimator that assigns weights to features (e.g., the coefficients of a linear model), the goal of recursive feature elimination (RFE) is to select features by recursively considering smaller and smaller sets of features. First, the estimator is trained on the initial set of features and the importance of each feature is obtained either through any specific attribute or callable. Then, the least important features are pruned from current set of features. That procedure is recursively repeated on the pruned set until the desired number of features to select is eventually reached.

An exemplary unsupervised technique for feature reduction is agglomerative feature clustering, as described in C. Wijaya, "Breaking down the agglomerative clustering process," Towards Data Science, available at towardsdatascience.com/breaking-down-the-agglomerative-clustering-process-1c367f74c7c2, which is incorporated herein by reference. In agglomerative feature clustering, the module 106b performs a hierarchical clustering using a bottom-up approach: each observation starts in its own cluster, and clusters are successively merged together. The linkage criteria determines the metric used for the merge strategy:

Ward minimizes the sum of squared differences within all clusters. It is a variance-minimizing approach and in this sense is similar to the k-means objective function but tackled with an agglomerative hierarchical approach.

Maximum or complete linkage minimizes the maximum distance between observations of pairs of clusters.

Average linkage minimizes the average of the distances between all observations of pairs of clusters.

Single linkage minimizes the distance between the closest observations of pairs of clusters After the feature reduction described above, model training module 106d executes each gradient boosting based ML model 108a-108n using a different subset of user profile attribute data to generate two outputs: a mean value for a given user attribute (or in some embodiments, a mean value for each user attribute) and an uncertainty measure of the given user attribute (or an uncertainty measure for each user attribute). The example shown in FIG. 4 relates to training models 108a-108n to predict a user's salary, where each ML model 108a-108n produces a predicted mean salary value for the corresponding subset of user profile data it receives as input and a predicted uncertainty measure of the salary values for the subset of data. Model training module 106d determines (step 204 of FIG. 2) an uncertainty measure of the plurality of gradient boosting based ML models 108a-108n for each user attribute based upon the predicted distribution of values generated by each ML model 108a-109n. In order to determine the epistemic variance, the aleatoric variance, and the total variance across all models 108a-108n, model training module 106d uses the following algorithms:

First, module 106d determines the mean of the predicted mean salary values generated by each model 108a-108n: Mean of Means=Mean(Mean Salary Value 1, Mean Salary 2, . . . , Mean Salary Value n). The result of this algorithm is the predicted value for user salary across the entire input user profile dataset.

Then, module 106d determines the variance of the predicted mean salary values output from each model 108a-108n: Variance of Means=Variance(Mean Salary 1, Mean Salary 2, . . . , Mean Salary n). The result of this algorithm is the epistemic variance for user salary that can be attributed to models 108a-108n.

Next, module 106d determines the mean of the variances generated by each model 108a-108n: Mean of Variances=Mean(Salary Variance 1, Salary Variance 2, . . . , Salary Variance n). The result of this algorithm is the aleatoric variance for user salary that can be attributed to models 108a-108n.

Module 106*d* then calculates the total variance attributable to models 108*a*-108*n* by combining the epistemic variance and the aleatoric variance: Total Variance=Epistemic Variance+Aleatoric Variance.

Figure 5:
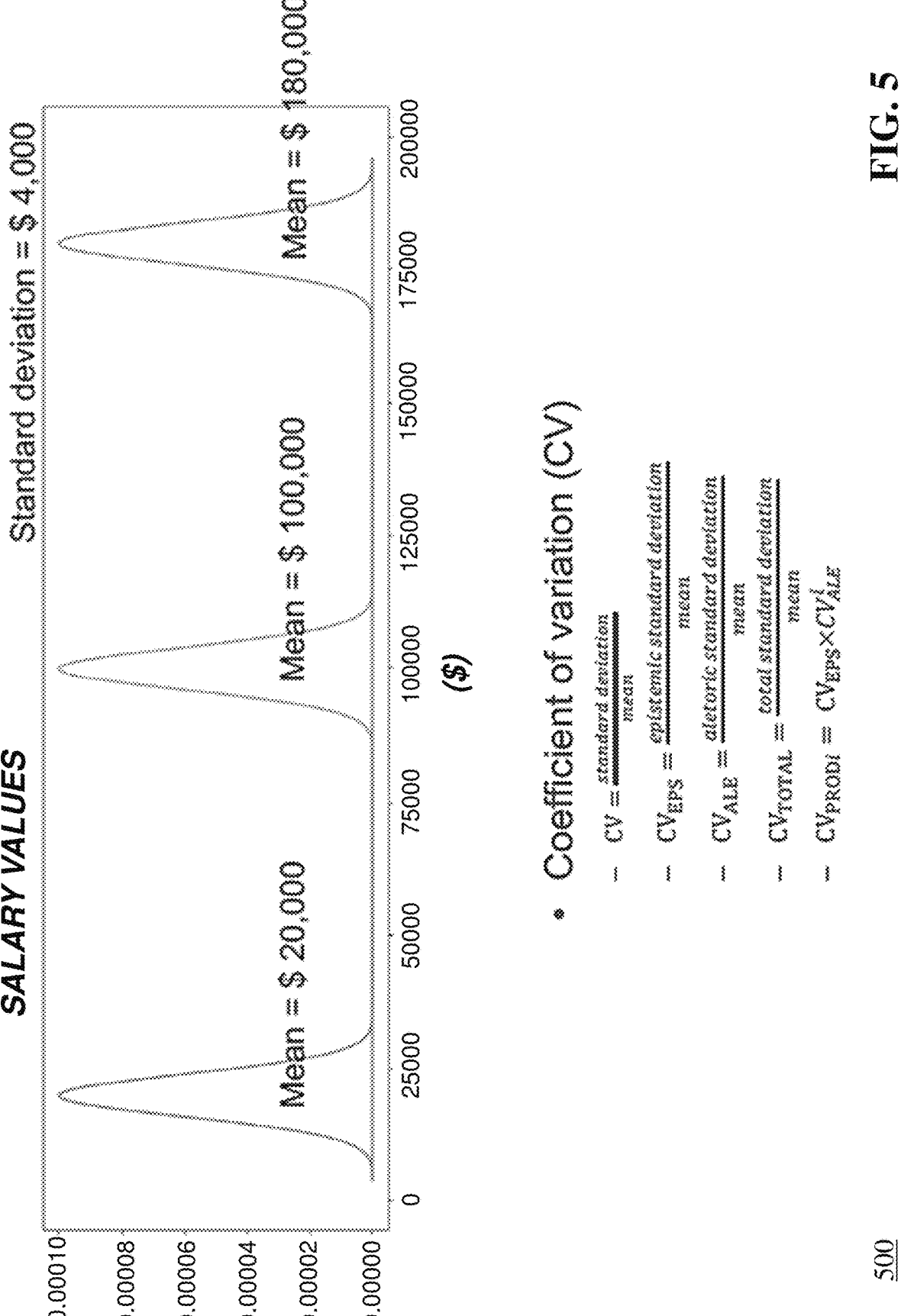
FIG. 5 is a diagram of a methodology used by model training module to determine a coefficient of variation for each of the epistemic variance, the aleatoric variance, and the total variance.

Using these calculated values, model training module 106*d* can determine whether the predicted salary value is an accurate prediction or not. FIG. 5 is a diagram of a methodology used by model training module 106*d* to determine a coefficient of variation for each of the epistemic variance, the aleatoric variance, and the total variance as determined above. As shown in FIG. 5, the coefficient of variation (CV) for a given value is generally understood as:

$$CV = \frac{\text{standard deviation}}{\text{mean}}$$

Using this equation, model training module 106*d* can determine the coefficient of variation for each of the variance values, as follows.

For epistemic variance (EPS):

$$CV_{EPS} = \frac{\text{epistemic standard deviation}}{\text{mean}}$$

For aleatoric variance (ALE):

$$CV_{ALE} = \frac{\text{aleatoric standard deviation}}{\text{mean}}$$

For total variance (TOTAL):

$$CV_{TOTAL} = \frac{\text{total standard deviation}}{\text{mean}}$$

Module 106*d* can also determine the product of the epistemic and aleatoric coefficients of variation:

$$CV_{PRODi} = CV_{EPS} \times CV_{ALE}^{i}$$

As can be understood, as the CV increases, the uncertainty associated with the predicted value also increases.

Figure 6:
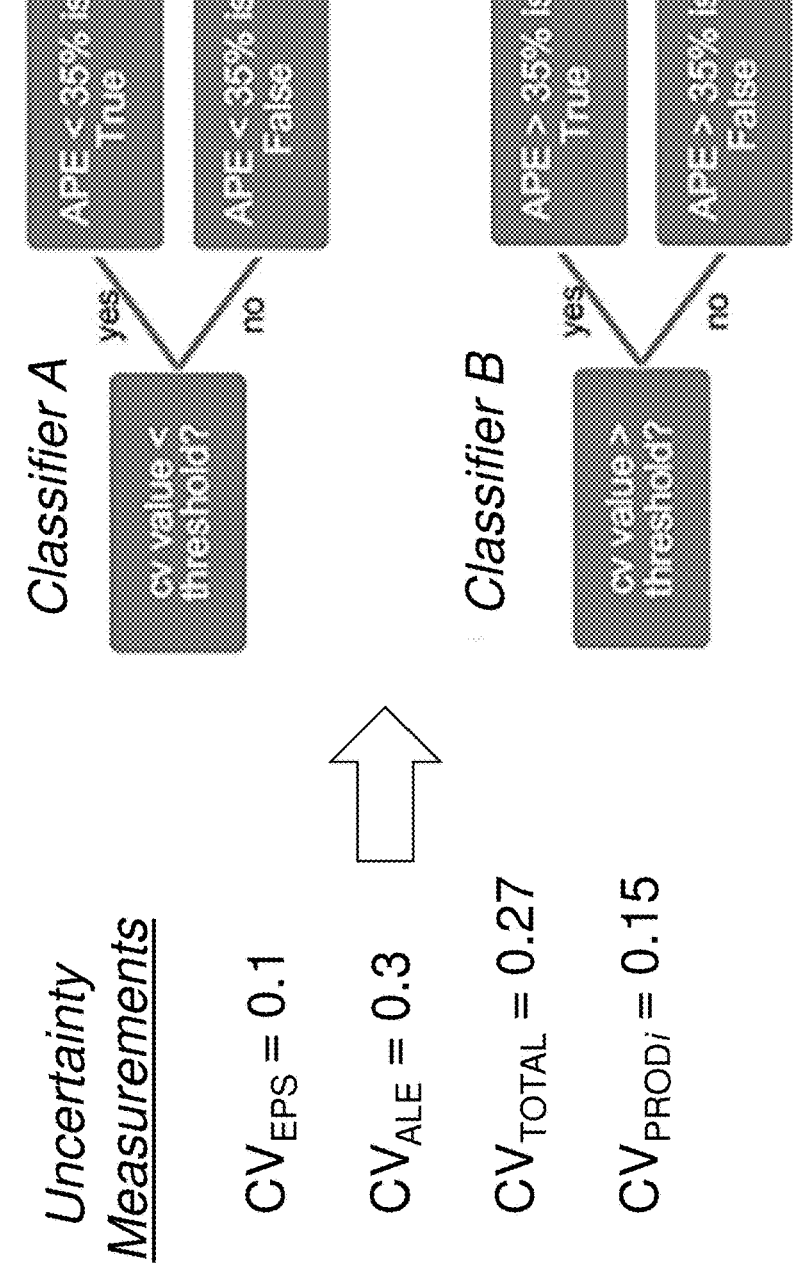
FIG. 6 is a workflow diagram showing how the uncertainty measurements generated by model training module are compared to a threshold value for each of a plurality of different classifiers in order to determine which classifier should be used.

Using the above uncertainty measurements, model training module 106*d* can select a particular classifier that is best suited for a specific business metric. For example, it may be desirable to have high precision or high recall (or both) when predicting the value for a user attribute. FIG. 6 is a workflow diagram showing how the uncertainty measurements generated by module 106*d* are compared to a threshold value for each of a plurality of different classifiers in order to determine which classifier should be used. As shown in FIG. 6, the uncertainty measurements are compared to a threshold value associated with classifier A. For this classifier, if the CV value is less than the threshold value, the absolute percentage error (APE) for the predicted values is less than 35%—indicating that the predictions from the model are likely to be accurate. If the CV value is not greater than the threshold value, then the APE for the predicted values is greater than 35%—indicating that the predictions from the model are not likely to be accurate.

For classifier B, the CV value is compared to a corresponding threshold value. For this classifier, if the CV value is greater than the threshold value, the APE for the predicted values is above 35%—indicating that the predictions from the model are not likely to be accurate. If the CV value is less than the threshold value, the APE for the predicted values is below 35%—indicating that the predictions from the model are likely to be accurate.

Advantageously, upon determining whether a predicted value is likely to be accurate or not, system 100 can use this information along with the trained gradient boosting based ML models 108*a*-108*n* to, e.g., automatically adjust the workflow associated with web application 110*a* to provide an improved user experience. Turning back to FIG. 2, a user at client computing device 102 can connect to web server computing device 110 in order to access functionality associated with web application 110*a*. In one example, the web application 110*a* can be a retirement planning tool that captures or collects data associated with the user of client computing device 102 and generates, e.g., a retirement plan for the user. It should be appreciated that other types of applications can be contemplated for use in system 100 without departing from the scope of invention.

Client computing device 102 can establish a communication session with web server computing device 110 and as part of this process, web server computing device 102 authenticates the user of client computing device 102. For example, the user can provide one or more authentication credentials (e.g., username, password, account ID, PIN, etc.) during a login procedure, and web server computing device 110 can validate the credentials to confirm the identity of the user and to confirm that the user has sufficient permissions to access the web application 110*a*.

Figure 7:
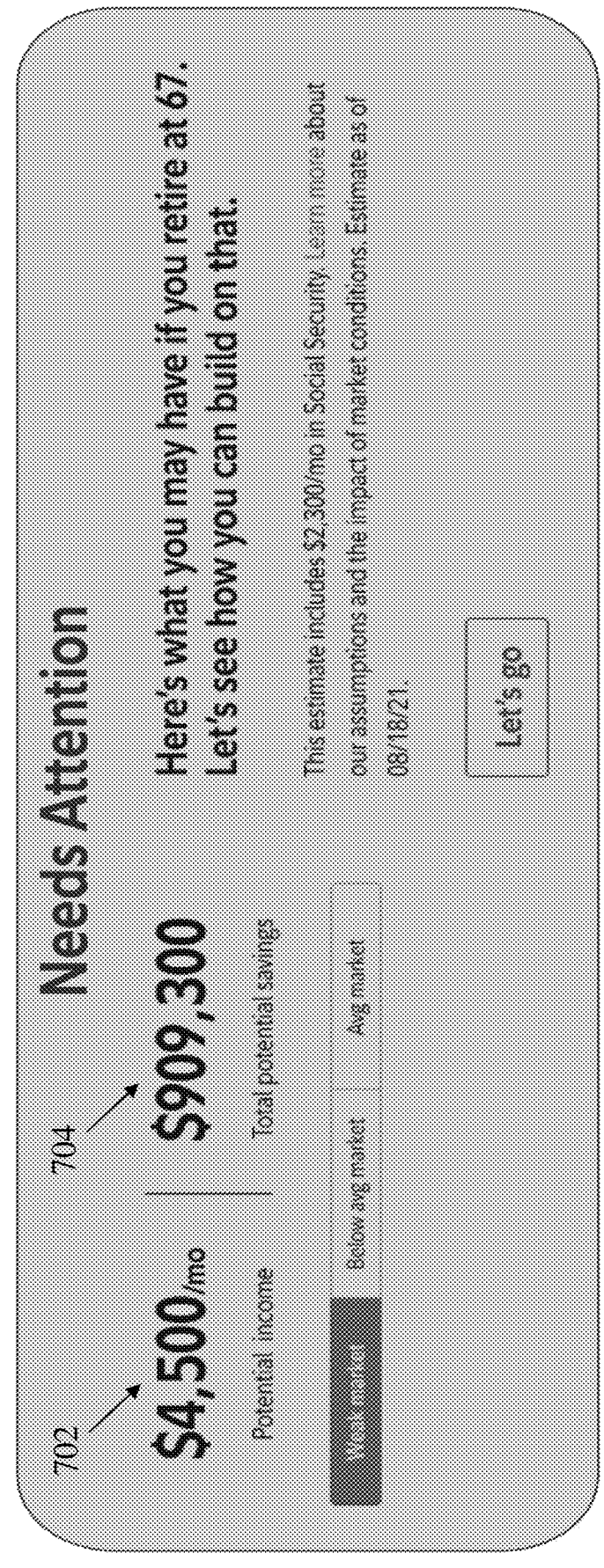
FIG. 7 is a diagram of an exemplary user interface screen for generating and displaying a predicted salary value for a user.

Upon launching the web application 110*a*, web server computing device 110 connects to server computing device 106 and UI module 106*a* creates one or more user interface screens to guide the user at client computing device 102 through a workflow for the web application 110*a*. In the example of a retirement plan generator, UI module 106*a* can generate one or more screens that, e.g., display information to and request information from the user in order to customize a retirement plan for the user's specific attributes and/or needs. In one embodiment, module 106*a* may generate a user interface screen that provides the user with a prediction of their salary (to be used to forecast retirement savings, etc.) using the predicted salary value generated by one or more of models 108*a*-108*n*. FIG. 7 is a diagram of an exemplary user interface screen 700 for generating and displaying a predicted salary value for a user, as generated by UI module 106*a*.

As part of generating this user interface screen, UI module 106*a* receives (step 206) a request from client computing device 102 for prediction of one or more user attributes (e.g., the user's salary). This request can include a user identifier associated with the user at client device 102, such as an account number, customer ID, user profile number, etc.

Figure 8:
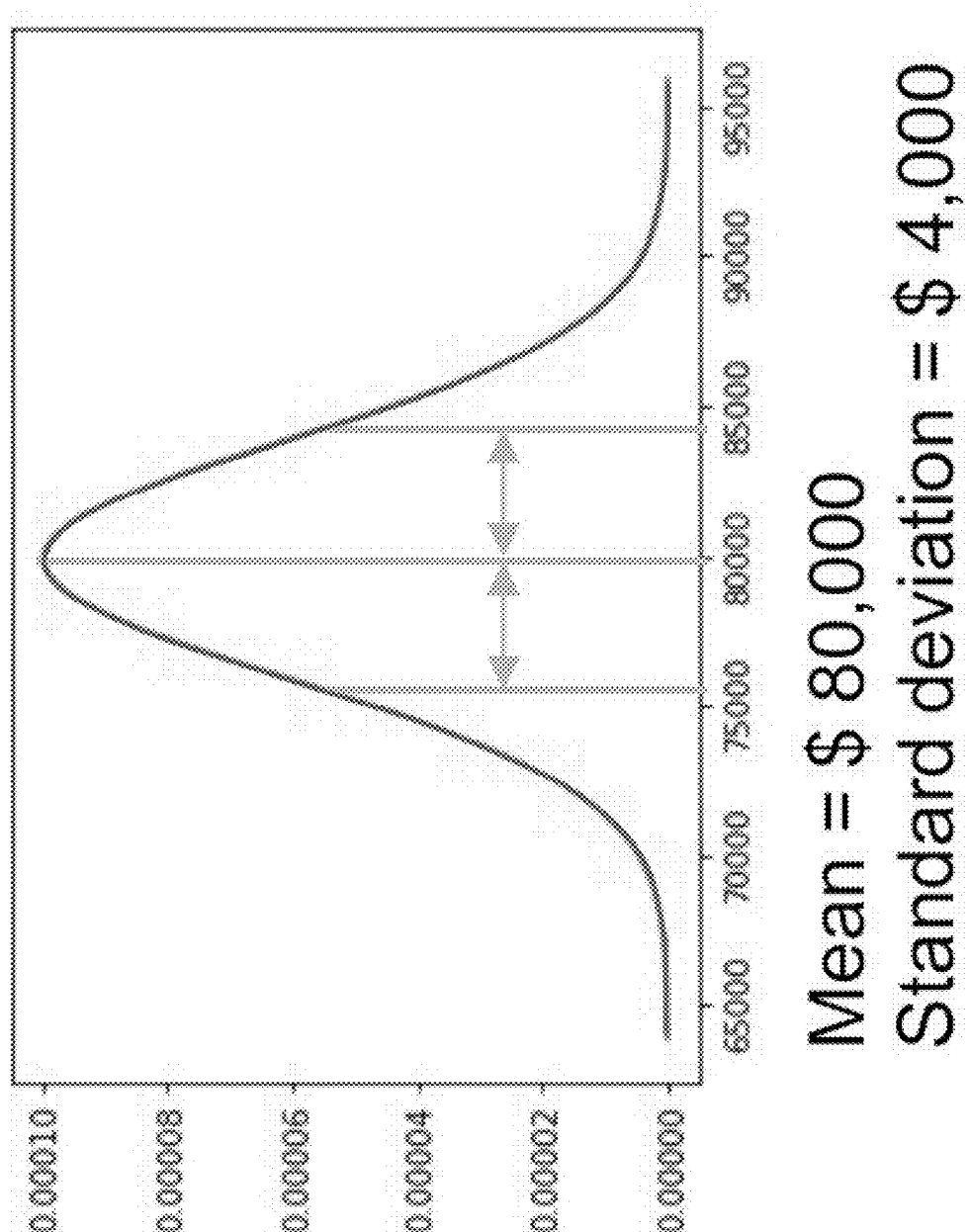
FIG. 8 is a diagram of an exemplary salary distribution generated by gradient boosting based machine learning models, along with mean and standard deviation.

UI module 106*a* transmits a request to prediction generation module 106*b* to generate a predicted salary value for the user based upon, e.g., one or more user attributes associated with the user identifier. In some embodiments, models 108*a*-108*n* are hosted behind a REST (or similar) application programming interface (API) endpoint that accepts data in JSON (or similar) format and/or the user identifier and returning the sufficient statistics of a distribution representing the probability of the user attribute magnitude. The number of models used in generating the distribution can depend on the level of accuracy desired (in general, a larger number of models implies better accuracy). For example, prediction generation module 106b can retrieve user demographic attributes, job attributes, financial attributes and so forth for the user and convert this information into input data (e.g., multidimensional vector) used to execute one or more of the trained ML models 108a-108n. As can be appreciated, prediction generation module 106b can be configured to use models 108a-108n to generate a prediction for a single user attribute or a plurality of user attributes. Also, the prediction can comprise a single value or a predicted distribution of values for the attribute. For example, prediction generation module 106b generates (step 208), for each user attribute, a first predicted distribution for the user attribute using one or more of the trained gradient boosting ML models 108a-108n. FIG. 8 is a diagram of an exemplary salary distribution 800 generated by models 108a-108n, along with mean and standard deviation.

Based upon this predicted distribution, prediction classification module 106c classifies (step 210), for each user attribute, an accuracy of the first predicted distribution for the user attribute based upon the uncertainty measure of the trained gradient boosting ML models 108a-108n. As described above, the CV value(s) for a given model 108a-108n may be instructive for system 100 to understand whether the predicted distribution is accurate or not. Prediction classification module 106c can evaluate the uncertainty measures associated with the model(s) 108a-108n used to generate the predicted distribution and classify the uncertainty measures to define an accuracy for the distribution. For example, when the APE for a given distribution is above a predetermined percentage (e.g., 35%), prediction classification module 106c can flag the distribution as 'inaccurate' whereas when the APE is below the predetermined percentage, module 106c can flag the distribution as 'accurate.' Prediction classification module 106c then provides (step 214) the first predicted distribution and the accuracy for each user attribute to the client computing device 102 (and/or web server computing device 110) for display of a first predicted value from the distribution For example, web application 110a can utilize a value from the predicted distribution to perform one or more processing functions, such as generating a retirement plan and then instruct UI module 106a to display the corresponding plan results to the user, as shown in FIG. 7. The user interface screen 700 includes relevant details about the retirement plan generated for the user—such as potential income 702, total potential savings 704 and so forth.

Importantly, UI module 106a can modify one or more sensory aspects of the user interface based upon the accuracy classification. For example, where the salary prediction is flagged as inaccurate, UI module 106a can modify a visual aspect (e.g., change a color) of one or more UI elements and/or add customized messages to the UI indicating to the user that certain aspects of the retirement plan may need to be recalculated using more accurate salary information. In some embodiments, UI module 106a can modify an aural aspect (e.g., play a sound) associated with one or more UI elements, where the sound indicates certain aspects of the retirement plan may need to be recalculated using more accurate salary information. As shown in FIG. 7, the UI 700 includes a message at the top of the screen ("Needs Attention") and the UI background is shaded a particular color (e.g., red) to visually indicate to the user that action is required. In some embodiments, the user can click on the UI and enter his or her accurate salary information. Upon receiving the updated salary information, prediction classification module 106c updates (216), for each user attribute, the first predicted value for the user attribute based upon input received from the client computing device 102. Then, web application 110a can re-run the retirement plan with the accurate data as provided by the user and present the results to the user.

In some embodiments, UI module 106a can leverage the predicted distribution and accuracy classification prior to having the web application 110a re-run the retirement plan for the user. In one example, when the user at client computing device 102 logs into the web application 110a, the application can request salary information for the user from server computing device 106. UI module 106a can determine that, in some cases, a user may not have any salary information saved. In these cases, prediction generation module 106b and prediction classification module 106c can generate a predicted salary distribution for the user (as described above). If the uncertainty measurements for the salary distribution are high, UI module 106a can display a user interface asking the user to update their salary information. Alternatively, if the user does have salary information stored, prediction generation module 106b and prediction classification module 106c can generate a predicted salary distribution for the user (as described above) and compare the predicted salary distribution with the salary information stored for the user. If the two values are very different and the uncertainty measurements for the predicted salary distribution are low, UI module 106a can display a user interface asking the user to update their salary information as it may be out of date.

FIG. 9 is a diagram of an exemplary user interface 900 requesting updated salary information from the user. As shown, the user at client computing device 102 can enter their current salary information and UI module 106a can store the updated information for future reference.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for predicting user attributes using uncertainty estimate modeling, the system comprising a server computing device with a memory for storing computer-executable instructions and a processor that executes the computer-executable instructions to:

train each of a plurality of gradient boosting machine learning models using historical user profile data to predict a distribution of values for each of a plurality of user attributes, wherein the predicted distribution of values for each user attribute comprises a distribution with predicted summary statistics;

determine an uncertainty measure of the plurality of gradient boosting machine learning models for each user attribute based upon the predicted distribution of values generated by each machine learning model for the user attribute;

receive a request for prediction of one or more user attributes from a client computing device, the request including a user identifier of a user at the client computing device;

generate, for each of the one or more user attributes, a first predicted distribution for the user attribute using one or more of the trained gradient boosting machine learning models, comprising:

identifying a number of trained machine learning models to execute based upon the request received from the client computing device, determining one or more characteristics of the user based upon the user identifier, executing each of the identified machine learning models using the one or more characteristics as input to generate a predicted distribution for the user attribute, and combining the predicted distributions generated by each identified machine learning model to create the first predicted distribution;

classify, for each of the one or more user attributes, an accuracy of the first predicted distribution for the user attribute based upon the uncertainty measure of the plurality of gradient boosting machine learning models for the user attribute;

provide the first predicted distribution and the accuracy for each of the one or more user attributes to the client computing device, wherein a first predicted value of the user attribute from the first predicted distribution is displayed in a user interface on the client computing device and one or more sensory features of the displayed first value correspond to the accuracy;

update, for each of the one or more user attributes, the first predicted value for the user attribute based upon input received from the client computing device.

2. The system of claim 1, wherein the uncertainty measure for the plurality of machine learning models comprises (i) an uncertainty measure of predicted means from each machine learning model for the given user attribute and (ii) a mean of predicted standard deviations from each machine learning model for the given user attribute.

3. The system of claim 2, wherein training each of a plurality of machine learning models using historical user profile data to predict a distribution of values for each of a plurality of user attributes comprises training each machine learning model on a different subset of the historical user profile data.

4. The system of claim 1, wherein the uncertainty measure of the plurality of machine learning models for each user attribute comprises a coefficient of variation based upon a predicted mean and a predicted standard deviation for each machine learning model.

5. The system of claim 4, wherein classifying, for each of the one or more user attributes, an accuracy of the first predicted distribution for the user attribute based upon the uncertainty measure of the plurality of machine learning models for the user attribute comprises:

comparing the uncertainty measure of the plurality of machine learning models for the user attribute to a threshold value;

selecting a prediction classifier based upon the comparison; and classifying the accuracy of the first predicted distribution for the user attribute using the prediction classifier.

6. The system of claim 1, wherein the historical user profile data comprises user demographic attributes, user asset values, user account information, and user behavior attributes.

7. The system of claim 6, wherein the plurality of user attributes comprise a salary, a net worth, and a retirement age.

8. The system of claim 1, wherein the one or more sensory features of the displayed value comprise a color that changes based upon the accuracy.

9. The system of claim 1, wherein the input received from the client computing device comprises a replacement value for the user attribute.

10. The system of claim 1, wherein the input received from the client computing device comprises an indicator confirming the accuracy of the first predicted value for the user attribute.

11. A computerized method of predicting user attributes using uncertainty estimate modeling, the method comprising:

training, by a server computing device, each of a plurality of machine learning models using historical user profile data to predict a distribution of values for each of a plurality of user attributes, wherein the predicted distribution of values for each user attribute comprises a distribution with predicted summary statistics;

determining, by the server computing device, an uncertainty measure of the plurality of machine learning models for each user attribute based upon the predicted distribution of values generated by each machine learning model for the user attribute;

receiving, by the server computing device, a request for prediction of one or more user attributes from a client computing device, the request including a user identifier of a user at the client computing device;

generating, by the server computing device for each of the one or more user attributes, a first predicted distribution for the user attribute using one or more of the trained gradient boosting machine learning models, comprising:

identifying a number of trained machine learning models to execute based upon the request received from the client computing device, determining one or more characteristics of the user based upon the user identifier, executing each of the identified machine learning models using the one or more characteristics as input to generate a predicted distribution for the user attribute, and combining the predicted distributions generated by each identified machine learning model to create the first predicted distribution;

classifying, by the server computing device for each of the one or more user attributes, an accuracy of the first predicted distribution for the user attribute based upon the uncertainty measure of the plurality of machine learning models for the user attribute;

providing, by the server computing device, the first predicted distribution and the accuracy for each of the one or more user attributes to the client computing device, wherein a first predicted value of the user attribute from the first predicted distribution is displayed in a user interface on the client computing device and one or more sensory features of the displayed first value correspond to the accuracy;

updating, by the server computing device for each of the one or more user attributes, the first predicted value for the user attribute based upon input received from the client computing device.

12. The method of claim 11, wherein the uncertainty measure for the plurality of machine learning models comprises (i) an uncertainty measure of predicted means from each machine learning model for the given user attribute and (ii) a mean of predicted standard deviations from each machine learning model for the given user attribute.

13. The method of claim 12, wherein training each of a plurality of machine learning models using historical user profile data to predict a distribution of values for each of a plurality of user attributes comprises training each machine learning model on a different subset of the historical user profile data.

14. The method of claim 11, wherein the uncertainty measure of the plurality of machine learning models for each user attribute comprises a coefficient of variation based upon a predicted mean and a predicted standard deviation for each machine learning model.

15. The method of claim 14, wherein classifying, for each of the one or more user attributes, an accuracy of the first predicted distribution for the user attribute based upon the uncertainty measure of the plurality of machine learning models for the user attribute comprises:

comparing the uncertainty measure of the plurality of machine learning models for the user attribute to a threshold value;

selecting a prediction classifier based upon the comparison; and classifying the accuracy of the first predicted distribution for the user attribute using the prediction classifier.

16. The method of claim 11, wherein the historical user profile data comprises user demographic attributes, user asset values, user account information, and user behavior attributes.

17. The method of claim 16, wherein the plurality of user attributes comprise a salary, a net worth, and a retirement age.

18. The method of claim 11, wherein the one or more sensory features of the displayed value comprise a color that changes based upon the accuracy.

19. The method of claim 11, wherein the input received from the client computing device comprises a replacement value for the user attribute.

20. The method of claim 11, wherein the input received from the client computing device comprises an indicator confirming the accuracy of the first predicted value for the user attribute.

* * * * *